(12) United States Patent
Lee et al.

(10) Patent No.: US 10,967,707 B2
(45) Date of Patent: Apr. 6, 2021

(54) AUTOMATIC VENTILATION SYSTEM AND METHOD FOR VEHICLES

(71) Applicants: HYUNDAI MOTOR COMPANY, Seoul (KR); KIA MOTORS CORPORATION, Seoul (KR)

(72) Inventors: Jang Yong Lee, Jeollabuk-do (KR); Mi Seon Kim, Seoul (KR); Wan Lee, Jeonju-si (KR); Kang Ju Cha, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 575 days.

(21) Appl. No.: 15/704,951

(22) Filed: Sep. 14, 2017

(65) Prior Publication Data

US 2018/0178625 A1    Jun. 28, 2018

(30) Foreign Application Priority Data

Dec. 28, 2016    (KR) .................. 10-2016-0181223

(51) Int. Cl.
*B60H 1/00*    (2006.01)
*F24F 11/65*    (2018.01)
(Continued)

(52) U.S. Cl.
CPC ......... *B60H 1/00821* (2013.01); *B60H 1/008* (2013.01); *B60H 1/00849* (2013.01);
(Continued)

(58) Field of Classification Search
CPC  B60H 1/00821; B60H 1/008; B60H 1/00849; F24F 11/0001; F24F 11/30;
(Continued)

(56) References Cited

U.S. PATENT DOCUMENTS 7,080,523 B2 *   7/2006   Maeda ............... B60H 1/00764
                                                  382/106
8,092,285 B2 *   1/2012   Mathur .............. B60H 1/00764
                                                   454/75
(Continued)

FOREIGN PATENT DOCUMENTS

DE    102005027214 A1    3/2006
DE    102006003071 A1    8/2007
(Continued)

OTHER PUBLICATIONS

Office action from DE 102017220719.1 dated Dec. 11, 2020, 10 pgs.

*Primary Examiner* — Kenneth J Hansen
*Assistant Examiner* — Dana K Tighe
(74) *Attorney, Agent, or Firm* — Brinks Gilson & Lione

(57) ABSTRACT

An automatic ventilation system and method for vehicle are disclosed. The system includes: a ventilator to control a ventilation operation of an indoor space of a second vehicle; an input unit to receive information of automatic ventilation for a first vehicle, the automatic ventilation automatically performed based on a change in $CO_2$ concentration inside the first vehicle; and a controller to determine an initiation time point of an automatic ventilation operation of the second vehicle based on the received automatic ventilation information and to control the ventilator to ventilate the indoor space of the second vehicle at the determined initiation time point, thereby pleasantly ventilating an indoor space of the second vehicle with reference to data related to an automatic ventilation operation of first vehicle including a $CO_2$ sensor.

19 Claims, 6 Drawing Sheets

(51) Int. Cl.
*F24F 11/00* (2018.01)
*F24F 11/64* (2018.01)
*F24F 11/30* (2018.01)
*F24F 110/50* (2018.01)
*F24F 110/70* (2018.01)

(52) U.S. Cl.
CPC .......... *F24F 11/0001* (2013.01); *F24F 11/30* (2018.01); *F24F 11/64* (2018.01); *F24F 11/65* (2018.01); *F24F 2110/50* (2018.01); *F24F 2110/70* (2018.01)

(58) Field of Classification Search
CPC ........ F24F 11/64; F24F 11/65; F24F 2110/50; F24F 2110/70
USPC .......................................................... 454/75
See application file for complete search history.

(56) References Cited

U.S. PATENT DOCUMENTS

| | | | | |
|---|---|---|---|---|
| 9,688,194 B2* | 6/2017 | MacNeille | ......... | B60H 1/00771 |
| 2015/0118946 A1* | 4/2015 | Yeon | ................. | B60H 1/00764 |
| | | | | 454/75 |
| 2015/0283880 A1* | 10/2015 | Mathiasson | ........ | B60H 1/00778 |
| | | | | 454/75 |
| 2016/0318368 A1* | 11/2016 | Alger | ................. | B60H 1/00771 |

FOREIGN PATENT DOCUMENTS

| | | |
|---|---|---|
| DE | 102009046828 A1 | 5/2011 |
| DE | 102015007063 B3 | 7/2016 |

* cited by examiner

$$h_\theta(x) = \theta^T X \quad (\text{FEATURE INFERENCE MODEL})$$

$$h_\theta(x) : \quad \text{TIME REQUIRED TO REACH LIMIT CONCENTRATION OF } CO_2$$

$$h_\theta(x) = 0.53x \quad (X: \text{NUMBER OF PEOPLE})$$

| Feature | FACTOR AFFECTED BY TIME REQUIRED TO REACH LIMIT CONCENTRATION |
|---|---|
| NUMBER OF PASSENGERS | 0.53 |

[ INFERRING RESULT OF WEIGHT FOR EACH FEATURE ]

AUTOMATIC VENTILATION SYSTEM AND METHOD FOR VEHICLES

CROSS-REFERENCE TO RELATED APPLICATION

This application claims priority to and the benefit of Korean Patent Application No. 10-2016-0181223, filed on Dec. 28, 2016, which is hereby incorporated by reference in its entirety.

FIELD

The present disclosure relates to an automatic ventilation system and method for vehicles.

BACKGROUND

The statements in this section merely provide background information related to the present disclosure and may not constitute prior art.

As various convenient equipment is installed in a vehicle, a smart ventilation system has been developed to pleasantly ventilate the interior of the vehicle by measuring $CO_2$ concentration in the vehicle and automatically switch an indoor air mode of the vehicle to an outdoor air mode when the measured $CO_2$ concentration is equal to or greater than a reference value.

FIG. 1 is a diagram illustrating a conventional automatic ventilation system for vehicles. FIG. 2 is a flowchart of an automatic ventilation method of a conventional automatic ventilation system for vehicles.

Referring to FIGS. 1 and 2, a conventional automatic ventilation system 10 for vehicles includes a $CO_2$ sensor 11 and a ventilation control device 12.

Here, the automatic ventilation system 10 measures $CO_2$ concentration inside a vehicle (e.g., a passenger compartment) in which a driver and a passenger ride through the $CO_2$ sensor 11 and, when the measured $CO_2$ concentration inside the vehicle is equal to or greater than a first threshold value [S11], this indicates that the interior of the vehicle is not currently pleasant due to the $CO_2$ concentration and, thus, the automatic ventilation system 10 controls the ventilation control device 12 to change a vehicle ventilation mode (i.e., an indoor air mode preventing outdoor air from being introduced into the vehicle) to an outdoor air mode for introducing outdoor air into the inside [S12].

In addition, the automatic ventilation system 10 measures $CO_2$ concentration inside the vehicle through the $CO_2$ sensor 11 and, as a measurement result, when the measured $CO_2$ concentration inside the vehicle is equal to or less than a second threshold value [S13], this indicates that the $CO_2$ concentration of the vehicle is reduced to a pleasant level and, accordingly, the automatic ventilation system 10 controls the ventilation control device 12 to change a vehicle ventilation mode (i.e., switch from the outdoor air mode to the indoor air mode) [S14].

However, the conventional automatic ventilation system 10 for vehicles has a problem in that a vehicle is automatically ventilated only when the $CO_2$ sensor 11 for measuring $CO_2$ concentration is installed in the vehicle.

SUMMARY

The present disclosure is directed to an automatic ventilation system and method for vehicles that substantially obviates one or more problems due to limitations and disadvantages of the related art.

The present disclosure provides an automatic ventilation system and method for vehicles, for automatically ventilating the interior of a vehicle according to $CO_2$ concentration inside the vehicle even in a vehicle without a $CO_2$ sensor.

In particular, the present disclosure may provide an automatic ventilation system and method for vehicles using, as sample data, a ventilation result of another vehicle operated according to $CO_2$ concentration measured by a $CO_2$ sensor included in another vehicle.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, an automatic ventilation system for vehicles includes: a ventilator configured to control a ventilation operation of an indoor space of a target vehicle, an input unit configured to receive information of automatic ventilation from another vehicle, the automatic ventilation automatically performed based on change in $CO_2$ concentration inside the another vehicle, and a controller configured to determine an initiation time point of an automatic ventilation operation of the target vehicle based on the received automatic ventilation information and to control the ventilator to ventilate the indoor space of the target vehicle at the determined initiation time point.

In another aspect of the present disclosure, an automatic ventilation method of an automatic ventilation system for vehicles includes: receiving from a first vehicle, via an input unit, information of automatic ventilation that is automatically performed by the first vehicle based on change in $CO_2$ concentration inside the first vehicle; determining, by a controller of a second vehicle, an initiation time point of an automatic ventilation operation of the second vehicle based on the received automatic ventilation information; and ventilating, by a ventilator of the second vehicle, an indoor space of the second vehicle at the determined initiation time point.

It is to be understood that both the foregoing general description and the following detailed description of the present disclosure are exemplary and explanatory and are intended to provide further explanation of the present disclosure as claimed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4 to 6 are diagrams for explanation of an automatic ventilation operation of an automatic ventilation system for vehicles.

Figure 1:
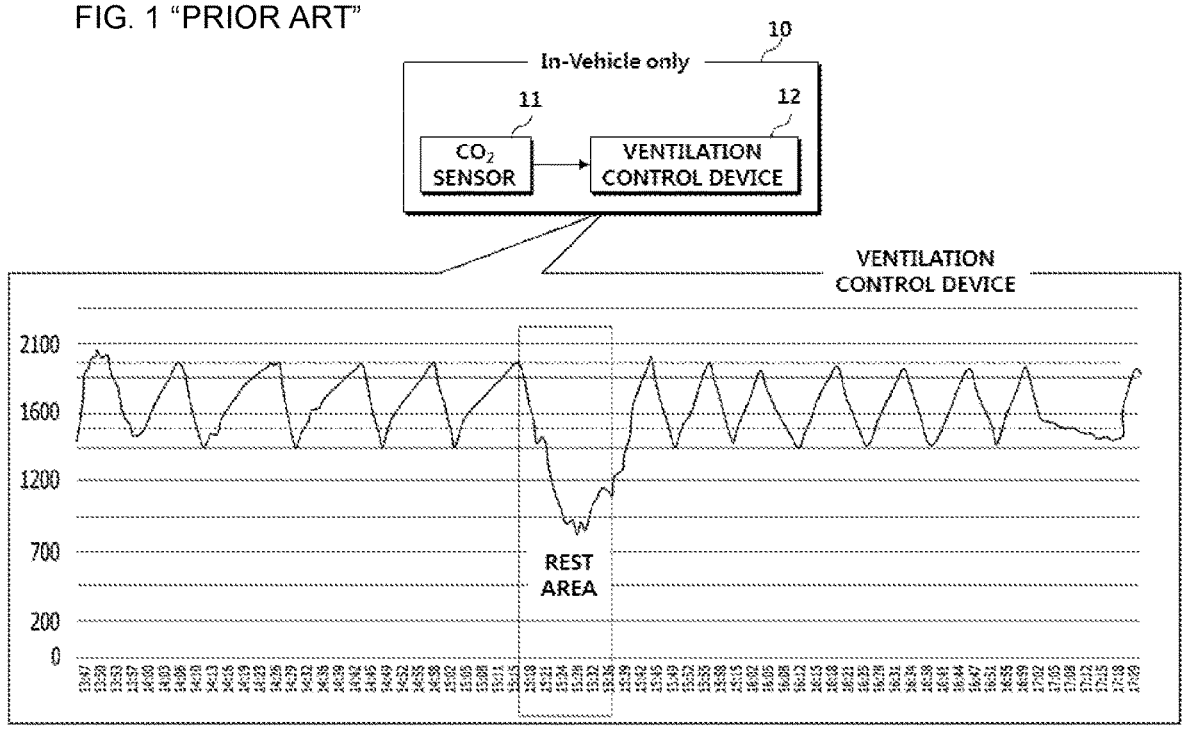
FIG. 1 is a diagram illustrating a conventional automatic ventilation system for vehicles.
Figure 2:
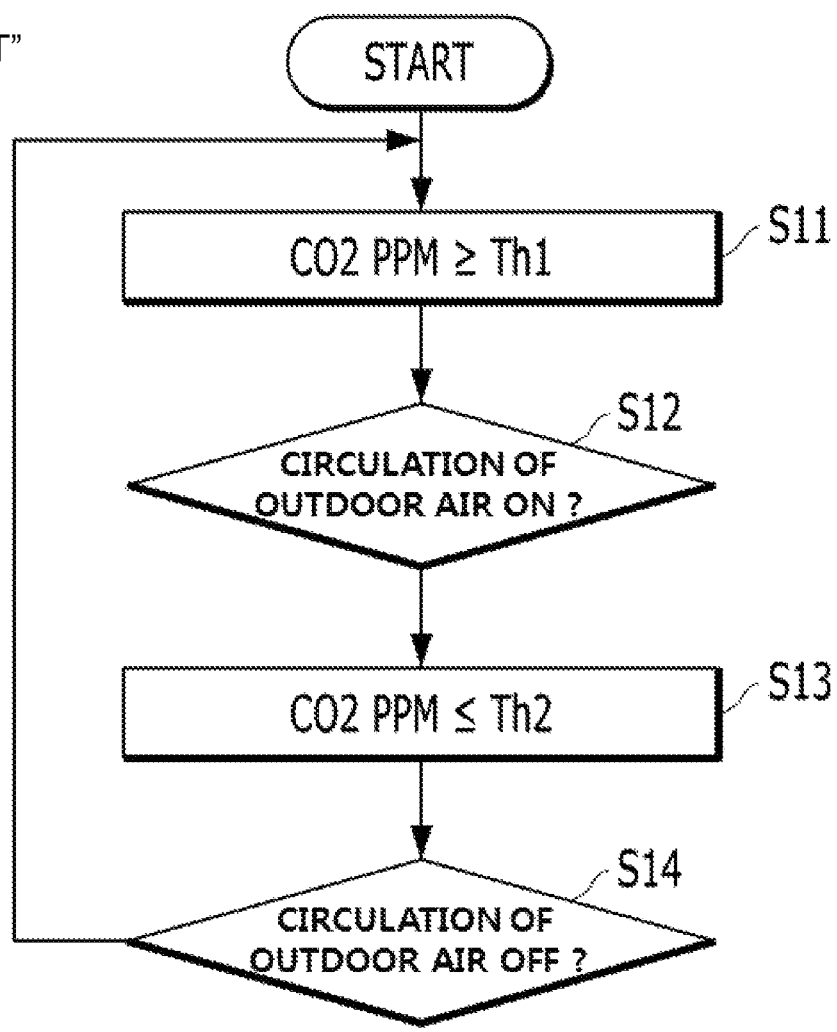
FIG. 2 is a flowchart of an automatic ventilation method of a conventional automatic ventilation system for vehicles.

The drawings described herein are for illustration purposes only and are not intended to limit the scope of the present disclosure in any way.

DETAILED DESCRIPTION

Exemplary forms of the present disclosure are described in detail so as for those of ordinary skill in the art to easily implement with reference to the accompanying drawings. However, the present disclosure may be implemented in various different forms and is not limited to these forms. To clearly describe the present disclosure, a part without concerning to the description is omitted in the drawings, and like reference numerals in the specification denote like elements.

Throughout the specification, one of ordinary skill would understand terms 'include', 'comprise', and 'have' to be interpreted in default as inclusive or open rather than exclusive or closed unless expressly defined to the contrary. Further, the terms such as "unit", "module", etc. disclosed in the specification mean units for processing at least one function or operation, which may be implemented by hardware, software, or a combination thereof.

Throughout the specification, one of ordinary skill would understand terms 'include', 'comprise', and 'have' to be interpreted in default as inclusive or open rather than exclusive or closed unless expressly defined to the contrary. Throughout this specification, the same reference numerals in the drawings denote the same element.

With reference to FIGS. 3 to 6, an automatic ventilation procedure of an automatic ventilation system for vehicles applied to exemplary forms of the present disclosure will be described below in detail.

Figure 3:
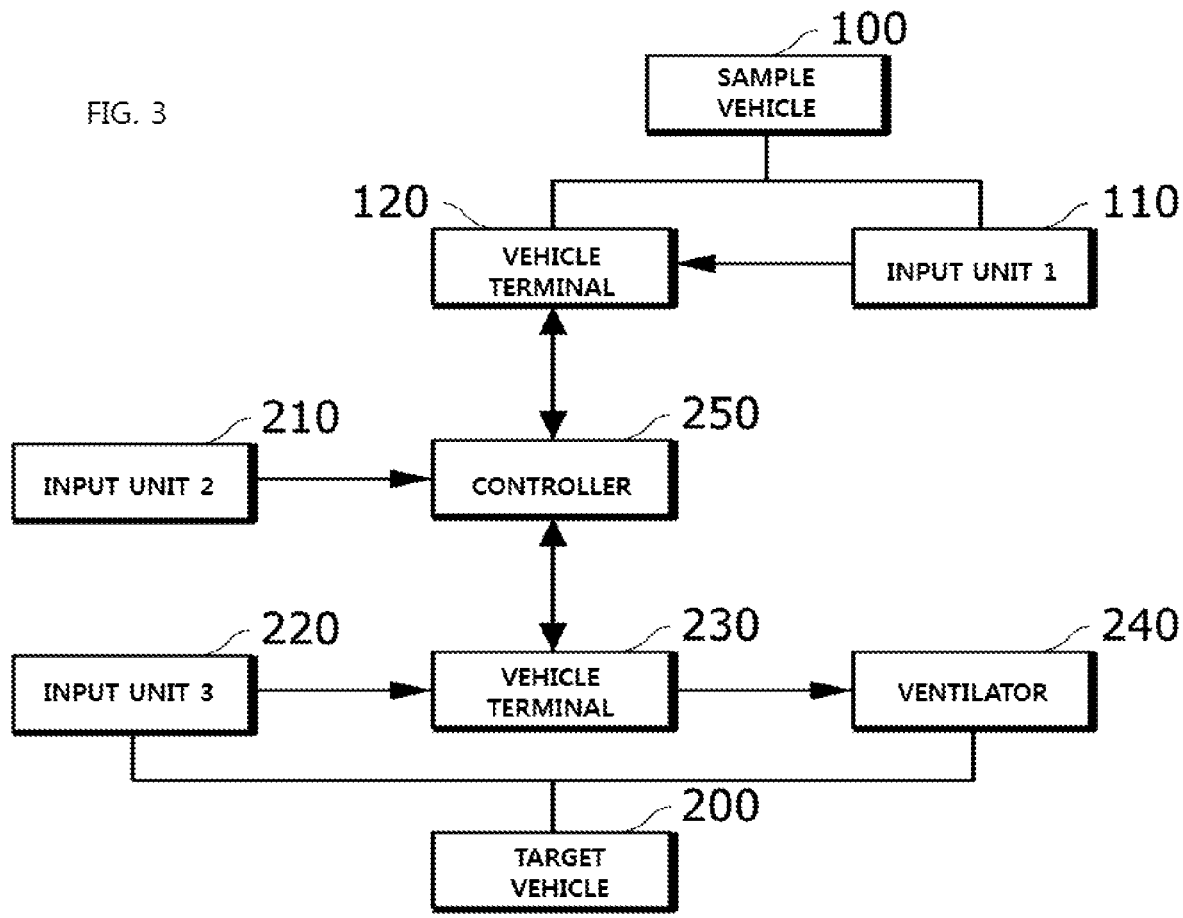
FIG. 3 is a block diagram illustrating an example of an automatic ventilation system for vehicles.

FIG. 3 is a block diagram illustrating an example of an automatic ventilation system for vehicles according to an exemplary form of the present disclosure.

Figure 4:
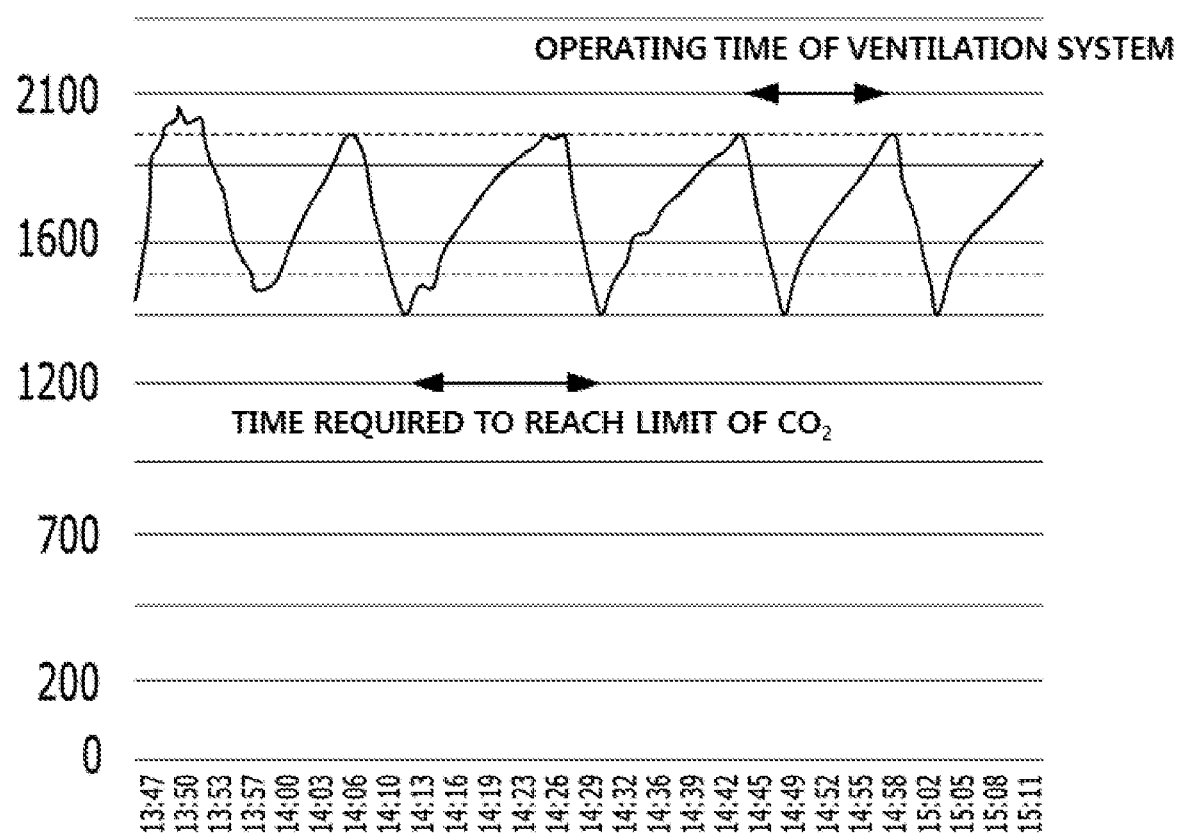
Figure 5:
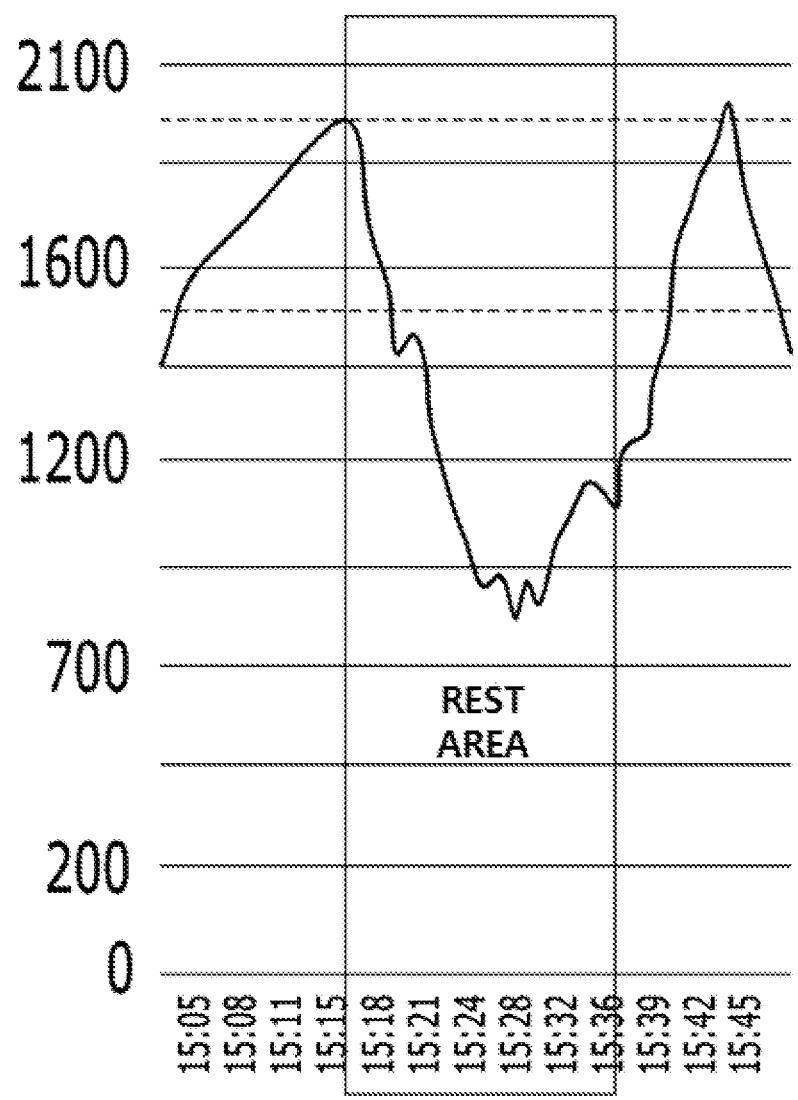

FIGS. 4 to 6 are diagrams for explanation of an automatic ventilation operation of an automatic ventilation system for vehicles according to an exemplary form of the present disclosure.

Referring to FIGS. 3 to 6, the automatic ventilation system may include: a target vehicle 200 that corresponds to the present vehicle and does not include a $CO_2$ sensor; and a sample vehicle 100 that corresponds to another vehicle, includes a $CO_2$ sensor, and provides the target vehicle 200 with information of automatically performed ventilation in response to change in indoor $CO_2$ concentration measured by the $CO_2$ sensor.

First, upon receiving automatic ventilation information containing first feature information related to the sample vehicle and operation result information of the automatic ventilation system from the sample vehicle 100, a first input unit 110 of the sample vehicle 100 may transmit the automatic ventilation information of the sample vehicle 100 to a controller 250 through a vehicle terminal 120 of the sample vehicle 100.

In this case, the first feature information may include at least one of the number of passengers inside the sample vehicle (passenger compartment), ventilation operation information of the sample vehicle, body control operation information of the sample vehicle, and vehicle indoor volume information of the sample vehicle.

The body control operation information may include at least one of information on opening and closing of a window of the sample vehicle and information on opening and closing of a sunroof of the sample vehicle (information on whether the sunroof is closed or open and an operating time).

A second input unit 210 of the target vehicle 200 may receive second feature information used in an automatic ventilation operation other than the automatic ventilation information of the sample vehicle 100 and transmit the received second feature information to the controller 250.

The second feature information may include at least one of traffic on the road of the target vehicle 200, weather, air temperature, fine dust concentration, whether a door is open, whether a window is open, and whether a sunroof is open.

A third input unit 220 of the target vehicle 200 may transmit third feature information to be compared with first feature information related to the sample vehicle, which is to be input through the first input unit 110, to the controller 250 through a vehicle terminal 230 of the target vehicle 200.

The third feature information may include at least one of the number of passengers inside the target vehicle (passenger compartment), ventilation operation information of the target vehicle, body control operation information of the target vehicle, and vehicle indoor volume information of the target vehicle.

The body control operation information may include at least one of information on opening and closing of a window of the target vehicle and information on opening and closing of a sunroof of the target vehicle (information on whether the sunroof is closed or open and an operating time).

A ventilator 240 of the target vehicle 200 may change an indoor ventilation mode of the target vehicle 200 to an indoor air mode or an outdoor air mode according to control of the controller 250.

The controller 250 may determine an initiation time point of an automatic ventilation operation of the target vehicle 200 using the automatic ventilation information input through the first input unit 110 and control the ventilator 240 to ventilate an indoor space of the target vehicle 200 at the determined initiation time point.

That is, the controller 250 may compare at least one feature of the sample vehicle (e.g., at least one of the number of passengers inside the sample vehicle (passenger compartment), ventilation operation information of the sample vehicle, body control operation information of the sample vehicle, and vehicle indoor volume information of the sample vehicle of the first feature information contained in the automatic ventilation information of the sample vehicle 100) with at least one feature of the target vehicle (e.g., at least one of the number of passengers inside the target vehicle, ventilation operation information of the target vehicle, body control operation information of the target vehicle, vehicle indoor volume information of the target vehicle contained in the third feature information related to the target vehicle 200, and input through the third input unit 230). When the compared features correspond to each other, the controller 250 may determine a time point of initiating an automatic ventilation operation of the target vehicle 200 and a duration of the automatic ventilation operation with reference to the operation result information of the automatic ventilation system contained in the automatic ventilation information of the sample vehicle 100 and control the ventilator 240 to ventilate the interior of the target vehicle 200 at the determined initiation time point for the determined duration.

Here, as a comparison result obtained by comparing first feature information and third feature information when the ventilator 240 operates in an indoor air mode of shutting off outdoor air as a ventilation mode, when the first feature information and the third feature information correspond to each other, the controller 250 may count the time desired for the $CO_2$ concentration inside the sample vehicle 100 to reach the preset limit concentration with reference to operation result information of the automatic ventilation system of the sample vehicle 100 and control the ventilator 240 to automatically change the ventilation mode from the indoor air mode to an outdoor air mode for permitting introduction of outdoor air to automatically ventilate the target vehicle 200 at the counted time.

In this case, as shown in FIG. 4, the controller 250 may control the target vehicle 200 to operate in the outdoor air mode at the counted time and control the ventilator 240 to be maintained in the outdoor air mode for the time desired for the $CO_2$ concentration inside the sample vehicle 100 to reach the preset limit concentration.

While counting the time desired for the $CO_2$ concentration inside the sample vehicle 100 to reach the preset limit concentration, when the controller 250 detects change in a preset environment inside the target vehicle 200 according to second feature information input through the second input unit 210, the controller 250 may reset the counted time and recount the time.

That is, as shown in FIG. 5, upon receiving second feature information indicating that a vehicle door, a vehicle window, or a vehicle sunroof is open due to stopping at a "Rest area" during driving of the target vehicle 200, from the second input unit 210 and detecting change in a preset environment inside the target vehicle 200, the controller 250 may reset the counted time and recount the time.

When the controller 250 determines that automatic ventilation relatively adversely affects a user based on the automatic ventilation information of the sample vehicle 100, the controller 250 may further delay a control time point of the automatic ventilation related operation.

For example, the controller 250 may count the time desired for the $CO_2$ concentration inside the sample vehicle 100 to reach the preset limit concentration and may control the ventilator 240 to measure fine dust concentration outside the target vehicle 200 before the ventilation mode of the target vehicle 200 is changed to the outdoor air mode from the indoor air mode at the counted time and to maintain the ventilation mode of the target vehicle 200 in the indoor air mode until the outdoor fine dust concentration is equal to or less than the preset limit concentration when the measured outdoor fine dust concentration exceeds the preset limit concentration.

As another example, the controller 250 may count the time desired for the $CO_2$ concentration inside the sample vehicle 100 to reach the preset limit concentration and may control the ventilator 240 to maintain the ventilation mode of the target vehicle 200 in the indoor air mode until the target vehicle 200 exits a tunnel when the target vehicle 200 is supposed to pass through the tunnel before the ventilation mode of the target vehicle 200 is switched to the outdoor air mode from the indoor air mode at the counted time.

The aforementioned automatic ventilation system may be applied to, for example, a bus.

That is, a bus may variously form an inference model for recognizing entry and exit of a passenger in real time and infer an operating time of an automatic ventilation system based thereon.

For example, the inference model may be linear regression for fastest understanding.

When linear regression is applied to the inference model, a result shown in FIG. 6 may be inferred from the sample vehicle 100.

In this case, the target vehicle 200 may apply a feature with a current situation applied thereto to the inferred result of FIG. 6 to prepare for execution of improved ventilation control.

For example, when a bus door is frequently closed and opened, a current situation is a pleasant situation since the interior of the bus is frequently ventilated by virtue of frequent closing and opening of the bus door and, accordingly, counting of the time desired for the $CO_2$ concentration inside the bus to reach the limit concentration may be reset such that the interior of the bus is not frequently automatically-ventilated.

As another example, in heavy traffic, when an air conditioner is turned on while a bus window is closed in summer, the interior of the bus may be automatically ventilated.

The aforementioned present disclosure can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

As described above, the interior of a vehicle may be conveniently and pleasantly ventilated through the automatic ventilation system for vehicles according to at least one of the exemplary forms of the present disclosure.

In particular, even in a conventional vehicle that does not include a $CO_2$ sensor, the interior of the vehicle may be automatically and pleasantly ventilated with reference to data related to an automatic ventilation operation of another vehicle including a $CO_2$ sensor.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

It will be apparent to those skilled in the art that various modifications and variations can be made in the present disclosure without departing from the spirit or scope of the present disclosures. Thus, it is intended that the present disclosure covers the modifications and variations of this present disclosure.

What is claimed is:

1. An automatic ventilation system for vehicles, comprising:
    a ventilator configured to control a ventilation operation of an indoor space of a second vehicle; and
    a controller configured to:
        when a first vehicle performs an automatic ventilation based on change in $CO_2$ concentration inside the first vehicle, receive information of the automatic ventilation from the first vehicle,
        determine an initiation time point of an automatic ventilation operation of the second vehicle based on the received automatic ventilation information, and control the ventilator of the second vehicle to ventilate the indoor space of the second vehicle at the determined initiation time point, wherein the received automatic ventilation information comprises operation result information of an automatic ventilation system performing the automatic ventilation of the first vehicle and at least one feature information of the first vehicle.

2. The automatic ventilation system according to claim 1, wherein:
the $CO_2$ concentration inside the first vehicle is measured by a $CO_2$ sensor installed in the first vehicle; and
the second vehicle is configured to determine the initiation time point without a $CO_2$ sensor.

3. The automatic ventilation system according to claim 1, wherein: the controller is configured to determine the initiation time point of the automatic ventilation operation of the second vehicle based on the operation result information of the automatic ventilation system of the first vehicle and the at least one feature information of the first vehicle.

4. The automatic ventilation system according to claim 3, wherein the controller is configured to count time desired for the $CO_2$ concentration inside the first vehicle to reach a preset limit concentration based on the operation result information of the automatic ventilation system of the first vehicle and the at least one feature information of the first vehicle while the ventilator is operated in an indoor air mode and controls the ventilator to switch a ventilation mode of the second vehicle from the indoor air mode to an outdoor air mode at the counted time.

5. The automatic ventilation system according to claim 4, wherein the controller is configured to operate the outdoor air mode at the counted time and control the ventilator to be maintained in the outdoor air mode for the time desired for the $CO_2$ concentration inside the first vehicle to reach the preset limit concentration.

6. The automatic ventilation system according to claim 4, wherein, while counting the time, when the controller detects change in a preset environment inside the second vehicle, the controller is configured to reset the counted time and recount the time.

7. The automatic ventilation system according to claim 6, wherein the change in the preset environment comprises a mode in which at least one of a door or a sunroof of the second vehicle is open.

8. The automatic ventilation system according to claim 4, wherein the controller is configured to maintain the indoor air mode until external fine dust concentration of the second vehicle is equal to or less than a preset concentration when the external fine dust concentration exceeds the preset concentration before operating in the outdoor air mode at the counted time.

9. The automatic ventilation system according to claim 4, wherein the controller is configured to maintain the indoor air mode until the second vehicle exits a tunnel when the second vehicle is supposed to pass through the tunnel before operating in the outdoor air mode at the counted time.

10. The automatic ventilation system according to claim 3, wherein the at least one feature information comprises at least one of a number of passengers of the first vehicle, ventilation operation related information of the first vehicle, information regarding opening or closing of a window of the first vehicle, information regarding opening or closing of a sunroof of the first vehicle, or indoor volume information of the first vehicle.

11. An automatic ventilation method of an automatic ventilation system for vehicles, comprising:

when a first vehicle performs an automatic ventilation based on change in $CO_2$ concentration inside the first vehicle, receiving from the first vehicle, by a controller of a second vehicle, information of the automatic ventilation from the first vehicle;

determining, by the controller of the second vehicle, an initiation time point of an automatic ventilation operation of the second vehicle based on the received automatic ventilation information; and ventilating, by a ventilator of the second vehicle, an indoor space of the second vehicle at the determined initiation time point, wherein the automatic ventilation information comprises operation result information of an automatic ventilation system performing the automatic ventilation of the first vehicle and at least one feature information of the first vehicle.

12. The automatic ventilation method according to claim 11, wherein:
the $CO_2$ concentration inside the first vehicle is measured by a $CO_2$ sensor installed in the first vehicle; and
the second vehicle without a $CO_2$ sensor is configured to determine the initiation time point of the automatic ventilation operation of the second vehicle based on the automatic ventilation information of the first vehicle.

13. The automatic ventilation method according to claim 11, wherein:
the determining of the initiation time point comprises the initiation time point of the second vehicle based on the operation result information of the automatic ventilation system of the first vehicle and the at least one feature information of the first vehicle; and
the ventilating of the indoor space comprises switching an indoor air mode of the second vehicle to an outdoor air mode and ventilating the indoor space of the second vehicle at the determined initiation time point while the second vehicle is operated in the indoor air mode.

14. The automatic ventilation method according to claim 13, wherein the ventilating of the indoor space of the second vehicle comprises counting time desired for the $CO_2$ concentration inside the first vehicle to reach a preset limit concentration based on the operation result information of the automatic ventilation system of the first vehicle and the at least one feature information of the first vehicle while operating in the indoor air mode of the second vehicle and performing control to switch the indoor air mode to the outdoor air mode at the counted time.

15. The automatic ventilation method according to claim 14, wherein the ventilating of the indoor space of the second vehicle comprises operating the second vehicle in the outdoor air mode at the counted time and maintaining the second vehicle in the outdoor air mode for time desired for the $CO_2$ concentration inside the first vehicle to reach the preset limit concentration.

16. The automatic ventilation method according to claim 14, wherein the ventilating of the indoor space of the second vehicle comprises, while counting the time, upon detecting change in a preset environment inside the second vehicle, resetting the counted time and recounting the time.

17. The automatic ventilation method according to claim 16, wherein the change in the preset environment comprises a mode in which at least one of a door or a sunroof of the second vehicle is open.

18. The automatic ventilation method according to claim 14, wherein the ventilating of the indoor space of the second vehicle comprises maintaining the indoor air mode of the second vehicle until external fine dust concentration of the second vehicle is equal to or less than a preset concentration when the external fine dust concentration exceeds the preset concentration before the second vehicle is operated in the outdoor air mode from the indoor air mode at the counted time.

19. The automatic ventilation method according to claim 14, wherein the ventilating of the indoor space of the second vehicle comprises maintaining the indoor air mode of the second vehicle until the second vehicle exits a tunnel when the second vehicle is supposed to pass through the tunnel before operating in the outdoor air mode from the indoor air mode at the counted time.

\* \* \* \* \*